Figures 1, 2:
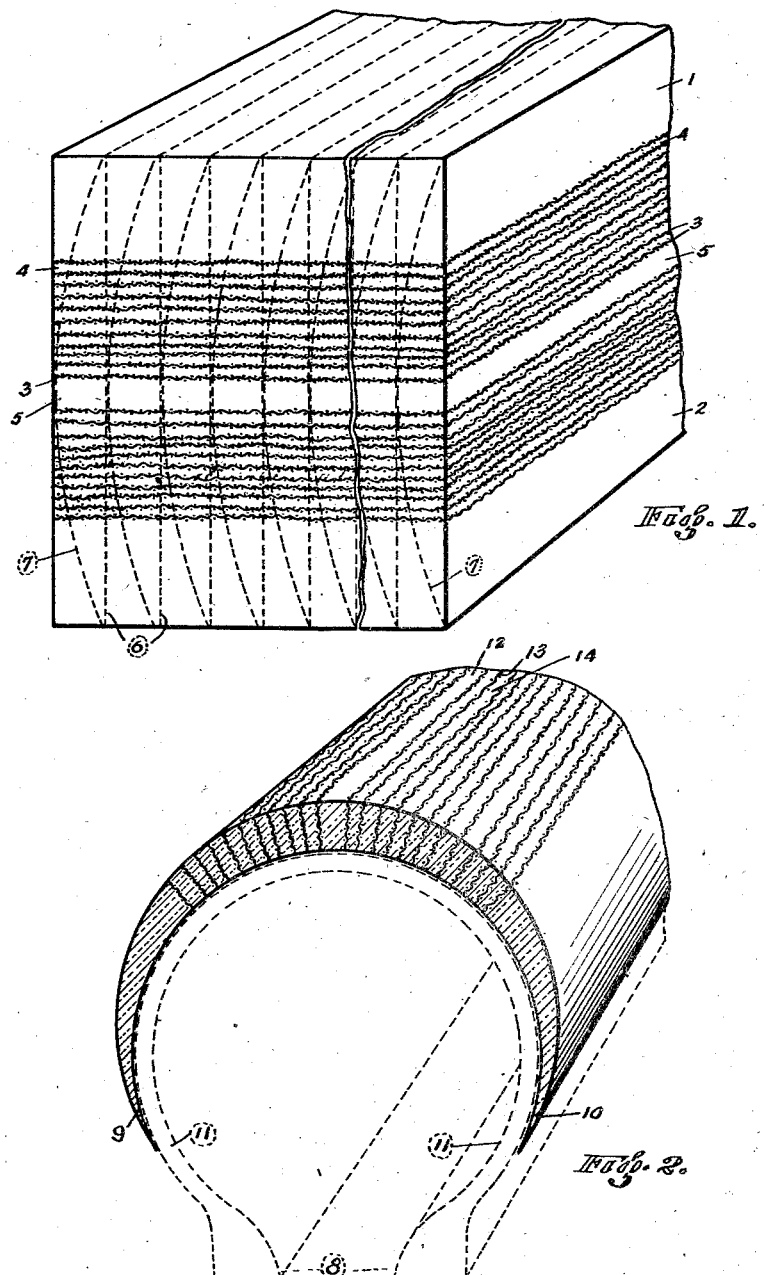

Jan. 21, 1930.  V. C. ANDERSON  1,744,025
METHOD OF MAKING TIRES
Filed Sept. 26, 1927

INVENTOR.
VIRGIL C. ANDERSON.
BY
Munn & Co.
ATTORNEYS.

Patented Jan. 21, 1930

1,744,025

UNITED STATES PATENT OFFICE

VIRGIL C. ANDERSON, OF SEATTLE, WASHINGTON

METHOD OF MAKING TIRES

Application filed September 26, 1927, Serial No. 222,134, and in Canada September 1, 1927.

My present invention relates to an improved method of making tires, and especially for building up the tread portion of pneumatic tires as used on automotive vehicles. By the utilization of the steps of my invention in the manufacture of tires, the durability of the tire is enhanced, and a nonskid wear surface is provided for the tread of the tire, to prevent lateral slipping.

In carrying out my invention I utilize vulcanizable rubber and woven fabric, the latter arranged in sheets alternating with the layers of rubber, and the finished tire comprises a tread portion made up of alternate annular fabric rings having their exterior annular edges exposed, and alternate layers or webs of rubber with their exterior annular edges exposed. The tire is thus provided with a tread of unvulcanized rubber having therein a series of spaced tread rings fashioned from fabric and arranged on edge with their exterior edges exposed and adapted to wear with the exposed rubber.

In the accompanying drawings I have illustrated one complete example of the physical embodiment of my invention showing how the steps of the process are carried out and the tread slab vulcanized to the tire casing.

Figure 1 is a perspective view showing a block of rubber having embedded therein sheets or layers of fabric, and showing by dotted lines the manner of cutting tread-slabs from this block;

Figure 2 as a detail view showing by dotted lines a cross section of a tire casing with the tread of my invention vulcanized thereto and also shown in cross section.

In carrying out my invention I first fashion a block of re-inforced rubber as in Figure 1 comprising an upper layer 1 and a lower layer 2 of rubber, and between these two layers are embedded successive, spaced sheets of fabric as 3, forming therebetween intermediate spaced layers 4 of rubber. At the longitudinal center of the block, I preferably use a central layer 5 of rubber having a contrasting color, as red, for instance, that forms a colored band 12 around the completed tire.

By the employment of suitable machinery or tools, this block is fashioned into slabs, whose shape, width and thickness are defined by the straight dotted lines 6 and curved dotted lines 7 in Figure 1. These slabs are cut in length corresponding to the exterior circumference of periphery of the tire casing 8 indicated by dotted lines in Figure 2 and a slab is vulcanized to the tire casing to form the tread portion of the casing. The flat face 6 of the slab is vulcanized to the tire casing, and the curved face 7 becomes the tread surface with the tapered edges 9 and 10 extending well around the opposite side walls 11 of the casing 8.

In Figure 1 it will be seen that the slab is cut on the lines 6 and 7, which lines extend at right angles to or are perpendicular to the parallel planes of the sheets or fabrics 3, the intermediate layers 4 and the central colored layer 5. By this mode of cutting the block into slabs, the tread slabs are fashioned with a central rubber tread ring (colored) 12, spaced edge rings 13 of fabric, and alternate, spaced webs 14 of rubber.

The exterior curvature of the tread slab is made to conform to the contour of the tire-tread, and the edges of the rings 13, and webs 14 present wear surfaces for the tread that are durable, and that will be instrumental in preventing skidding or lateral slipping of the tire when in use.

I claim:

1. The process of making a tire which consists in forming a block of alternate sheets of rubber and fabric material to a height substantially equal to the width of a tire, in slicing the block transversely relative to the sheets to form tread slabs and in vulcanizing a slab to a tire casing with the outer edges of the sheets forming the wear face of the tread.

2. The process of making a tire tread which consists in forming a block of alternate sheets of rubber and fabric material to a height substantially equal to the width of a tire and in slicing the block transversely relative to the sheets.

3. The process of making a tire tread which consists in forming a block of alternate sheets of rubber and fabric material and in cutting slabs from said block transversely to the sheets, the slabs being defined in cross section by a straight line and an arc.

4. A tire tread comprising a central section of annular fabric tread rings and alternate annular rubber tread webs having their edges forming the wear surface of the tread and the tire tread being defined in cross section by a straight line and by an arc.

VIRGIL C. ANDERSON.